May 12, 1942.                C. W. ASHLEY                2,282,690
                              TANK GAUGE
                         Filed Sept. 18, 1939

INVENTOR.
Cecil W. Ashley
BY A. B. Bowman
ATTORNEY.

Patented May 12, 1942

2,282,690

UNITED STATES PATENT OFFICE 2,282,690

TANK GAUGE

Cecil W. Ashley, El Centro, Calif.

Application September 18, 1939, Serial No. 295,433

4 Claims. (Cl. 73—322)

My invention relates to a tank gauge, more particularly for use in connection with under ground gasoline tanks or the like, and the objects of my invention are:

First, to provide a tank gauge of this class which is connected with the tank and which is operated by a float supported by the liquid in said tank;

Second, to provide a tank gauge of this class which saves time when measuring liquid in a tank;

Third, to provide a tank gauge of this class in which a shiftably mounted cover retains the gauge member, which is mounted on a float and arranged to rise when said cover is shifted out of the path of said gauge member;

Fourth, to provide a tank gauge of this class which is adapted to be positioned in a conventional tank fill pipe;

Fifth, to provide a tank gauge of this class in which the gauge member is provided with a retainer spring adapted to stop the upward movement of the gauge member when the tank fill pipe cap is not in place;

Sixth, to provide a tank gauge of this class in which the upper end of the gauge member is arranged to be surrounded by the hose nozzle when it is inserted in the fill pipe for supplying the tank; and Seventh, to provide a tank gauge of this class which is very simple and economical of construction, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Similar characters of reference refer to similar parts and portions throughout the several views of the drawing.

Figure 2:
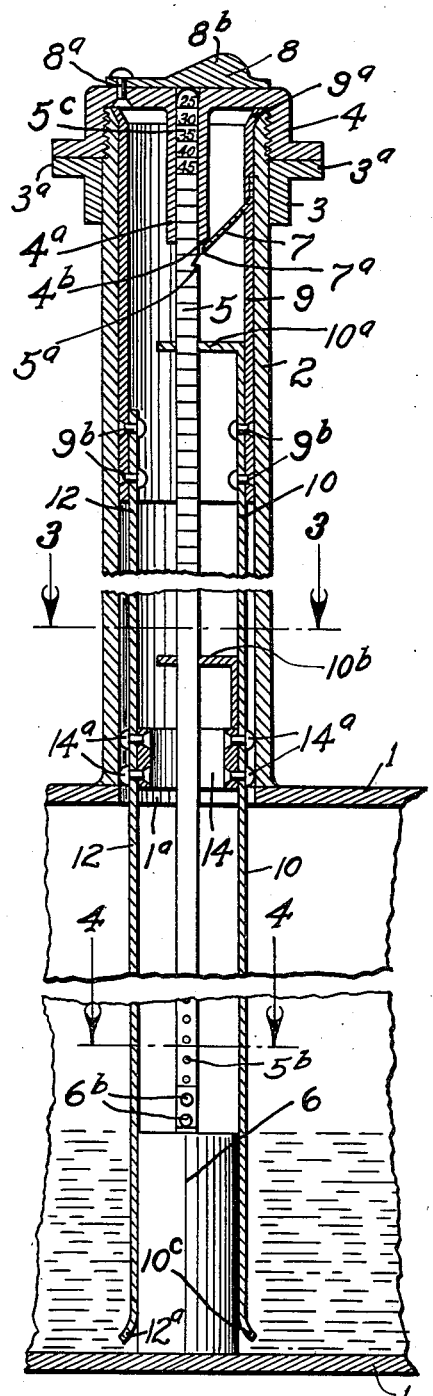
Fig. 2 is a longitudinal fragmentary sectional view taken from the line 2—2 of Fig. 1 showing parts in elevation to facilitate the illustration.

The tank 1, pipe 2, collar 3, cap 4, gauge member 5, float 6, retainer spring 7, cover 8, combined sleeve and guide member support 9, guide members 10, 11, 12 and 13 and support 14 constitute the principal parts and portions of my tank gauge.

Figure 1:
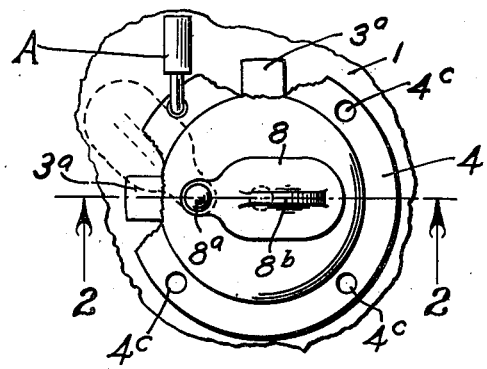
Figure 1 is a fragmentary top or plan view of my tank gauge showing by dash lines a varying position of the gauge member retainer cover.
Figure 3:
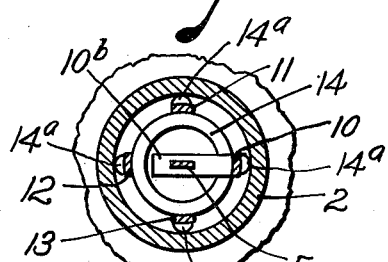
Fig. 3 is a fragmentary sectional view taken from the line 3—3 of Fig. 2.

The tank 1 may be of any conventional type and is provided with an opening 1a in its upper side around which is secured the lower end of the pipe 2. This pipe 2 may be secured to the tank 1 in the conventional manner by welding, brazing or otherwise. Positioned on the pipe 2 near its upper end is a collar 3. This collar 3 is rigidly secured to the pipe 2 and is adapted to support the cap 4 which is screw threaded on the upper end of the pipe 2. The collar 3 is provided with outwardly extending lug portions 3a as shown best in Fig. 1 of the drawing. The cap 4 is provided with a downwardly extending hollow cylindrical portion 4a in which the gauge member 5 is reciprocally mounted. When this cap 4 is in the position as shown in Fig. 2, the downwardly extending portion 4a at its lower edge 4b engages the retainer spring 7 holding it out of engagement with the gauge member 5 which is provided with a recessed portion 5a in which said retainer spring 7 is adapted to fit at its end portion 7a. The cover 8 is revolubly mounted on the cap 4 by means of the rivet 8a as shown best in Figs. 1 and 2 of the drawing. This cover 8 is provided with an upwardly extending lug portion 8b, as shown best in Figs. 1 and 2 of the drawing which serves as a hand hold. The combined sleeve and guide member suport 9 is hollow and cylindrical in shape and is pressed into the upper end of the pipe 2 and is provided with an angular flange portion 9a at its upper end and is secured to the guide members 10, 11, 12 and 13 at its lower end by means of the rivets 9b. The guide member 10 is substantially flat and rectangular in cross section and is provided with an angularly extending end portion 10a at its upper end in which the gauge member 5 is reciprocally mounted, as shown best in Fig. 2 of the drawing. Secured to the guide member 10 adjacent the upper side of the support 14 is an angularly extending bracket 10b in which the gauge member 5 is also reciprocally mounted as shown best in Figs. 2 and 3 of the drawing. The guide members 10, 11 12 and 13 are secured on the outer side of the support 14 by means of the rivets 14a. These guide members 10, 11, 12 and 13 extend downwardly near the bottom of the tank 1 and are provided with curved end portions 10c, 11a, 12a and 13a as shown best in Figs. 2 and 4 of the drawing. These guide members 10, 11, 12 and 13 guide the float 6 as it reciprocates upwardly and downwardly in the tank 1.

Figure 4:
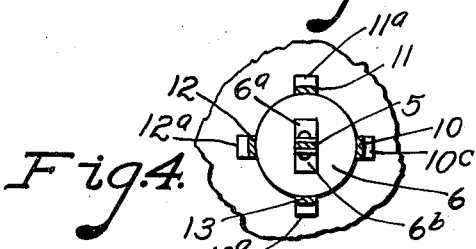
Fig. 4 is a fragmentary sectional view taken from the line 4—4 of Fig. 2

It will be noted that the gauge member 5, at its lower end, is provided with a plurality of holes 5b, which are arranged to engage rivets in the bracket members 6a and 6b which are secured to the upper side of the float 6 as shown best in Figs. 2 and 4 of the drawing it being necessary to cut off the lower end of the gauge member 5. This construction permits adjustment of the float 6 relative to the gauge member 5 which is provided with a graduated scale 5c on its one side at its upper end.

Figure 5:
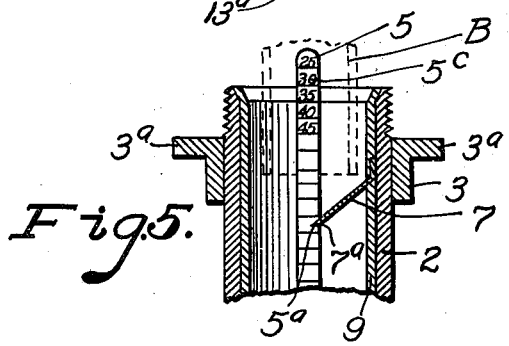
Fig. 5 is a fragmentary sectional view similar to that of Fig. 2 shown with the cap removed and the retainer spring in engagement with the gauge member and showing by dash lines a supply hose nozzle positioned over the gauge member.

The operation of my tank gauge is substantially as follows: When my tank gauge is positioned in the pipe and tank as shown in Fig. 2 of the drawing, a person may determine the amount of liquid in the tank by shifting the cover 8 out of the path of the gauge member 5. The float 6 then rises by means of buoyancy carrying the gauge member 5 upwardly to a corresponding level with the liquid in the tank. The amount of liquid in the tank may be determined by the graduated scale 5c on the gauge member 5 as it protrudes above the upper side of the cap 4. The gauge member 5 then may be pressed downwardly and secured in place by means of the cover 8. When the cap 4 is removed from the pipe 2, the lower edge 4b of the downwardly extending portion 4a is out of engagement with the retainer spring 7 permitting it to shift into the position as shown in Fig. 5 engaging and stopping the upward movement of the gauge member 5. A conventional supply nozzle, shown by dash lines B in Fig. 5 may be inserted in the upper end of the pipe 2 and over the gauge member 5 when it is desired to supply the tank 1 with more liquid. When the supply of liquid has been replenished in the tank 1, the cap 4 is replaced to the position as shown in Fig. 2 and a padlock A is secured in one of the holes 4c of the cap 4, thereby preventing the cap 4 from being turned and unscrewed from the pipe 2, it being noted that if the cap 4 is turned a short distance, the padlock A will engage one of the lugs 3a of the collar 3.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a tank gauge of the class described, the combination of a liquid tank provided with a vertical fill pipe, of a sleeve support secured in the upper end of said fill pipe, a plurality of float guide members secured thereto and extending downwardly to near the bottom of the tank, a float reciprocably mounted in said guide members, a rigid gauge member secured to said float and extending upwardly centrally in said sleeve support, a cap secured over said sleeve support and provided with a central opening in which said gauge member is reciprocably mounted, a cover member mounted on said cap and arranged to be shifted over said opening for said gauge member, said cap being provided with a downwardly extending guide portion and a retainer spring arranged to be engaged by said guide portion when the cap is screwed onto the fill pipe and arranged to engage a notch in said gauge member when said cap is removed.

2. In a tank gauge of the class described, the combination with a liquid tank and vertically positioned filler pipe, of a sleeve support rigidly secured in the upper end of said filler pipe, a screw cap threaded on the upper end of said filler pipe and provided with a central opening and a downwardly extending guide portion, a rigid gauge member reciprocably mounted in said guide portion, a float secured on the lower end of said gauge member, means secured to said sleeve support for guiding said float in said tank, a cover pivotally mounted on said cap and arranged to be shifted over the opening therein for holding said gauge member in a depressed position and means for latching said gauge member in a depressed position when the cap is removed.

3. In a tank gauge of the class described, the combination with a liquid tank and vertically positioned filler pipe, of a sleeve support rigidly secured in the upper end of said filler pipe, a screw cap threaded on the upper end of said filler pipe and provided with a central opening and a downwardly extending guide portion, a rigid gauge member reciprocably mounted in said guide portion, a float secured on the lower end of said gauge member, and means secured to said sleeve support for guiding said float in said tank, and means for latching said gauge in depressed position when said cap is removed.

4. In a tank gauge of the class described, the combination with a liquid tank provided with a vertical fill pipe, of a combined sleeve and guide member support secured in the upper end of said fill pipe, a plurality of separate resilient float guide members secured to said combined sleeve and guide member and extending downwardly to near the bottom of the tank, a float reciprocably mounted in said guide members, a rigid gauge member secured to said float and extending upwardly centrally in said combined sleeve and guide member support, a cap secured over said combined sleeve and guide member support and provided with a central opening in which said gauge member is reciprocably mounted, and a cover member mounted on said cap and arranged to be shifted over said opening.

CECIL W. ASHLEY.